(12) United States Patent
Feeney et al.

(10) Patent No.: US 10,525,642 B2
(45) Date of Patent: Jan. 7, 2020

(54) METHOD FOR INFUSING RESIN INTO A COMPOSITE LAMINATE

(71) Applicant: GKN Aerospace Services Structures Corporation, Cromwell, CT (US)

(72) Inventors: Christopher J. Feeney, Wallingford, CT (US); Steven Hayse, Prospect, CT (US); David A. Rogozinski, Bristol, CT (US)

(73) Assignee: GKN Aerospace Services Structures LLC, Cromwell, CT (US)

( * ) Notice: Subject to any disclaimer, the term of this patent is extended or adjusted under 35 U.S.C. 154(b) by 485 days.

(21) Appl. No.: 14/897,723

(22) PCT Filed: Jun. 6, 2014

(86) PCT No.: PCT/US2014/041228
§ 371 (c)(1),
(2) Date: Dec. 11, 2015

(87) PCT Pub. No.: WO2014/204672
PCT Pub. Date: Dec. 24, 2014

(65) Prior Publication Data
US 2016/0107400 A1     Apr. 21, 2016

Related U.S. Application Data

(60) Provisional application No. 61/837,350, filed on Jun. 20, 2013.

(51) Int. Cl.
*B29C 70/48*        (2006.01)
*B29C 70/44*        (2006.01)
(Continued)

(52) U.S. Cl.
CPC ............ *B29C 70/48* (2013.01); *B29C 70/443* (2013.01); *B29K 2105/0809* (2013.01); *B29K 2307/04* (2013.01)

(58) Field of Classification Search
CPC ............................. B29C 70/48; B29C 70/443
(Continued)

(56) References Cited

U.S. PATENT DOCUMENTS 3,962,394 A * 6/1976 Hall ..................... B29C 53/56
                                                  264/573
4,966,801 A * 10/1990 Becker .................. B29C 70/22
                                                  428/113

(Continued)

FOREIGN PATENT DOCUMENTS

DE          19926896 A1      12/2000
EP           1038656 A1       9/2000

(Continued)

OTHER PUBLICATIONS

Concise Encyclopedia of Composite Materials, Kelly, A., Pergamon Press, Oxford, 1989, accessed via https://books.google.com/books?id=44hO4PM-gegC&pg=PA250&lpg=PA250&dq=fiber+volume+fraction+70&source=bl&ots=miq17TmstL&sig=1mvmMAZigqLuH-40c3wq9aszueA&hl=en&sa=X&ved=0ahUKEwiMtp3W1pzaAhUhheAKHSn4AFc4KBDoAQhoMAw#v=one.*

(Continued)

*Primary Examiner* — Robert C Dye
*Assistant Examiner* — Russell E Sparks
(74) *Attorney, Agent, or Firm* — Bejin Bieneman PLC (57) ABSTRACT

A preform is infused with a resin to form a composite laminate. The preform is placed between a mold and a vacuum bag. An offset tool is placed to permit the vacuum bag to lift away from a surface of the preform in a controlled amount. A charge of the resin is injected between the vacuum bag and the preform to lift the vacuum bag off the surface of the preform and move the vacuum bag toward the offset tool, so that the resin occupies a volume between the (Continued)

vacuum bag and the preform. The preform is infused with the resin by applying a super-atmospheric pressure to an outer surface of the vacuum bag to transport the resin from the volume between the vacuum bag and the preform into a volume within the preform. The resin in the preform is cured, forming the composite laminate.

16 Claims, 6 Drawing Sheets

(51) Int. Cl.
 *B29K 105/08* (2006.01)
 *B29K 307/04* (2006.01)
(58) Field of Classification Search
 USPC .......................................................... 264/511
 See application file for complete search history.

(56) References Cited

U.S. PATENT DOCUMENTS

| | | | | |
|---|---|---|---|---|
| 5,665,301 | A * | 9/1997 | Alanko | B29C 70/443 |
| | | | | 264/257 |
| 5,885,513 | A * | 3/1999 | Louderback | B29C 35/0266 |
| | | | | 264/257 |
| 6,299,819 | B1 * | 10/2001 | Han | B29C 33/0038 |
| | | | | 264/510 |
| 6,558,590 | B1 * | 5/2003 | Stewart | B29C 43/10 |
| | | | | 264/134 |
| 7,866,969 | B2 | 1/2011 | Ruiz et al. | |
| 8,025,834 | B2 * | 9/2011 | Miller | B29C 70/443 |
| | | | | 264/557 |
| 8,178,032 | B2 | 5/2012 | Ruiz et al. | |
| 8,765,048 | B2 | 7/2014 | Ruiz et al. | |
| 2007/0063393 | A1 | 3/2007 | Vernin et al. | |
| 2009/0309271 | A1 * | 12/2009 | Miller | B29C 70/443 |
| | | | | 264/563 |
| 2013/0160257 | A1 | 6/2013 | Feeney et al. | |
| 2014/0027957 | A1 * | 1/2014 | Blot | B29C 70/443 |
| | | | | 264/526 |

FOREIGN PATENT DOCUMENTS

| | | |
|---|---|---|
| FR | 2828130 A1 | 2/2003 |
| WO | WO-8701072 A1 * | 2/1987 ............... B27D 1/08 |

OTHER PUBLICATIONS

International Search Report for PCT/US2014/041228 dated Nov. 5, 2014 (3 pages).
International Preliminary Report on Patentability for PCT/US2014/041228 dated Dec. 22, 2015 (7 pages).

* cited by examiner

METHOD FOR INFUSING RESIN INTO A COMPOSITE LAMINATE

CROSS-REFERENCE TO RELATED APPLICATIONS

This application claims priority to Patent Cooperation Treaty Patent Application No. PCT/U.S.2014/041228, filed on Jun. 6, 2014, which claims priority to U.S. provisional patent application No. 61/837,350, entitled "Method for Infusing Resin into a Composite Laminate" filed on Jun. 20, 2013, each of which applications are hereby incorporated herein by reference in their entireties.

STATEMENT OF FEDERALLY SPONSORED RESEARCH OR DEVELOPMENT

Not applicable.

BACKGROUND

This disclosure relates to methods of making composite laminates and, in particular, to improvements in the infusion of resin material in a fabric preform during resin transfer molding.

Large composite parts are often manufactured using a process called vacuum-assisted resin transfer molding (VARTM). Conventionally, plies of a dry fabric or fiber are first applied over a mold or tool surface to form a preform or lay up of a desired shape and thickness. With the preform having been formed over the tool, a flexible, gas impervious bag (i.e., a sheet or a film) is then placed over the preform and a vacuum is drawn between the mold and the bag. The vacuum draws the bag against the preform to compress the preform. An activated or catalyzed resin is then supplied into the volume of the preform between the bag and the old through an injection port. The vacuum slowly draws the resin through the preform (which is not fully dense as it is fibrous) so that the preform is fully infused with the resin. The resin is then cured with time and/or heat, so as to form the final composite part.

SUMMARY

The above-described VARTM process is typically time intensive. The resin infusion step, in particular, can be slow because it can take a large amount of time for the resin to completely wick through the preform. This problem is compounded by the fact that, in order to initially reduce the viscosity and improve the flowability of the resin, the resin is heated; however, the longer the resin infusion of the preform takes, the more viscous the resin will become as the resin begins to cure over the duration of infusion as the result of the heating. Thus, as the duration of resin infusion is increased, it becomes progressively more difficult to transport the resin and infuse the preform with the resin as there is increasing viscosity resistance to transport over time.

Another reason the current VARTM process is slow, is because the pressure gradient created by the vacuum is not greater than one atmosphere. Apart from any capillary action or surface wetting, this pressure gradient is the only force driving transport of the resin through the infusion lines, flow media (which are described in greater detail below) and the layers of the preform. This means that a typical infusion process can take many hours as the resin front slowly progresses through the volume of the preform.

To attempt to improve transport over the volume of the part and to reduce the infusion time, flow media is sometimes placed between the top surface of the preform and the vacuum bag. This flow media can provide regions through which the resin can be transported with little resistance effectively acting as surface runners to improve distribution of the resin over sections of the part. However, the use of flow media is expensive and consumes additional resin, which does not become part of the final composite laminate.

As another way to improve resin distribution, long distances are often spanned by progressively adding additional infusion points along the length of the part to overcome the viscosity increase with time and temperature.

Still yet, most conventional preforms are often prone to loft if they are not kept under constant vacuum during the resin infusion process. That is, the layers or plies of the fabric tend to shift or relax if a constant force is not applied to the layers or plies via the vacuum bag to keep the layers or plies tightly bundled together. This is problematic because, when the preform lofts, the fiber to resin ratio and thickness of the preform decreases. Accordingly, where high fiber density composite laminates are being formed, it is conventionally ill-advised to lift the vacuum bag from the surface of the preform.

Disclosed herein are improvements to the VARTM process which greatly improve the efficiency of resin infusion into the preform. This improved process reduces the cycle time for infusion by two orders of magnitude in comparison to traditional methods which include one or more of flow media and multiple injection points and without the disadvantages of high labor, cost, or complications of the setup.

According to one example, a method is disclosed of infusing a preform with a resin for the formation of a composite laminate in which the preform is placed between a mold and a vacuum bag. An offset tool is placed outside of the vacuum bag so as to permit the vacuum bag to lift away from a surface of the preform a controlled amount. A charge of the resin is injected between the vacuum bag and the preform so as to lift the vacuum bag off the surface of the preform and move the vacuum bag toward the offset tool, so that the resin occupies a volume between the vacuum bag and the surface of the preform. The preform is infused with the resin by applying a super-atmospheric pressure to an outer surface of the vacuum bag to transport the resin from the volume between the vacuum bag and the surface of the preform into a volume within the preform. The resin is cured in the preform, thereby forming the composite laminate.

During the step of injecting a charge of the resin between the vacuum bag and the preform, substantially none of the resin may be infused into the preform, which normally provides a significant amount of resistance. Instead, the resin is received in a volume adjacent, but outside of the body of the preform. Once the injected charge is in place, the step of infusing the preform may primarily involve transporting the resin into and through a thickness direction of the preform from the vacuum bag towards the mold. This means that the distance the resin must penetrate through the preform (which provides a resistive force to infusion) is only the thickness of the part, which is small in comparison to a distance through the body of the preform between an inlet port and outlet or bleed port as is conventionally the resin infusion pathway. Also, in this way, the method may not include or may avoid the use of flow media.

Applying the super-atmospheric pressure to the outer surface of the vacuum bag may include applying more than one super-atmospheric pressure. Initially, a first super-atmospheric pressure may be applied to the vacuum bag to transport the resin from the volume between the vacuum bag and the surface of the preform into the volume within the preform. Then subsequently, a second super-atmospheric pressure may be applied from outside of the vacuum bag to drive the preform (now infused with the resin) to a minimum thickness, in which the second super-atmospheric pressure is greater than the first super-atmospheric pressure. This minimum thickness corresponds to a thickness of the composite laminate in which there is substantially no resin in the space between the initial surface of the preform, when it was just fabric prior to application of the resin, and the vacuum bag.

After injecting the charge of the resin between the vacuum bag and the preform, all ports to a volume between the vacuum bag and the mold may be closed while the super-atmospheric pressure is initially applied to the vacuum bag. After the resin has infused the preform, at least one port to the volume between the vacuum bag and the mold may be opened in order to permit resin to exit the volume between the vacuum bag and the mold.

To help ensure a high fiber density component, the super-atmospheric pressure may be maintained through the step of curing the resin in the preform. A medium may be used to apply the super-atmospheric pressure and may include one or more gases or fluids received between the offset tool and the vacuum bag. The medium may be heated to assist in the step of curing the resin in the preform.

In some forms, the mold and the offset tool may be substantially rigid bodies. In other forms, the offset tool may be flexible and expandable to define a pre-determined fixed shape. For example, the offset tool may be a belt. In either event, the offset tool can help to define a volume outside of the vacuum bag in which the charge of resin is controllably received during injection. Then, during infusion, the offset tool can help to define a portion of a chamber in which the super-atmospheric pressure is created. It is contemplated that in some forms, the offset tool might be restricted or manipulated in such a way as to directly apply the super-atmospheric pressure itself.

Depending on the qualities of the composite laminate to be made, the charge of resin may include an excess amount of resin exceeding an amount of resin to completely infuse the preform. In some forms of the method, during the step of infusing the preform with the resin, the excess amount of resin may remain in the preform and may be cured in this position. By controlling the excess amount of resin in the mold cavity, the fiber density of the composite laminate may, at least to some extent, be controlled. By retaining an excess amount of resin in the composite laminate, the fiber volume density of the part might be reduced. In other forms of the method, during the step of infusing the preform with the resin, the excess amount of resin may be forced out of the preform through an exit port of the mold and removed from the composite laminate (aided at least in part by the super-atmospheric pressure). According to this form of the method, the fiber density of the preform can be increased, even to the maximum extent possible, by reducing the amount of resin found in the final part.

The step of injecting the charge of resin between the vacuum bag and the preform may include forcibly injecting the resin into the volume between the vacuum bag and the surface of the preform from a feed source via an injection port.

A vacuum may be applied between the vacuum bag and the mold during one or more of the steps of injecting the charge of the resin between the vacuum bag and the surface of the preform and infusing the preform with the resin.

After placing the fabric on the mold to form the preform, but before applying the vacuum bag over the surface of the preform, a release material can be applied to the surface of the preform. This release material permits the vacuum bag to be easily separated or lifted from the surface of the preform and thereby accommodates the resin to be transported through the release material into the preform during infusion.

In some forms of the method and related product made by the method, the composite laminate may be in the form of a fan case or other generally cylindrically/tubular shaped objects. In such instances, before placing the offset tool, the fabric may be wrapped around a mandrel to form a generally tubular-shaped preform. Then, the offset tool may be a generally tubular sleeve that is received around the mandrel, such that the mandrel is coaxial with the offset tool. In such an arrangement, as a result of the tightness of the fabric wrapping (using wrapping methods described and incorporated by reference below in the detailed description), the preform may not readily or substantially loft as a result of the preform having been tightly wrapped if the vacuum bag is lifted from the surface of the preform during the step of injecting the charge of the resin between the vacuum bag and the surface of the preform. Accordingly, the preform can have exceptionally good fiber/volume densities. The composite laminate made by the process described herein may have a fiber density of up to seventy percent or more which can exceed the fiber densities conventionally possible using traditional processes.

According to another aspect of this method, a method is disclosed of infusing a preform with a resin for the formation of a composite laminate in which the preform is placed between a mold and a vacuum bag. An offset tool is placed outside of the vacuum bag so as to permit the vacuum bag to lift away from the preform a controlled amount. A charge of the resin is injected between the vacuum bag and the preform so as to lift the vacuum bag off the surface of the preform and move the vacuum bag toward the offset tool, so that the resin occupies a volume between the vacuum bag and the surface of the preform. The preform is infused with the resin by creating a super-atmospheric pressure in the resin in the volume between the vacuum bag and the preform to transport the resin from the volume between the vacuum bag and the preform into a volume within the preform. Then, the resin is cured in the preform, thereby forming the composite laminate.

The super-atmospheric pressure in the resin may be created by a pressure exerted on an outer surface of the bag. The super-atmospheric pressure may also be created, for example, by an injection pressure of the resin into the space between the mold and the offset tool. Resin outflow ports may be opened downstream of the preform during at least a portion of the application of the super-atmospheric pressure. Prior to the application of the super-atmospheric pressure to the resin, the in-flow ports may be closed.

In some forms of the method, a sub-atmospheric pressure may be applied to a side of the preform that is opposite from the resin volume between the preform and the vacuum bag. For example, a vacuum may be drawn.

One having ordinary skill in the art will readily appreciate that various elements described above may be used either alone or in combination with one another according to various workable permutations in the production of a composite laminate.

According to another example, a composite laminate is made according to any of the above-described methods and their permutations. Among other things, the preform of the composite laminate made according to the above described methods can be tightly wrapped in such a way that the preform is not susceptible to lofting if the bag lifts from the surface of the preform. Because these preforms made according to these methods will not substantially loft if the vacuum bag is lifted from the surface of the preform, such preforms can be infused using the methods described herein without the preforms lofting and thereby reducing the fiber density of the final composite laminate. Accordingly, the final composite laminate may have fiber densities up to seventy percent or more, which is believed to be greater than the fiber densities found in any conventional woven fabric carbon fiber composite formed using VARTM processes to date.

In one form of the composite laminate, the fabric may be a triaxial carbon fiber fabric (triaxial in the sense that the tows of the fabric are arranged in an axial direction or one of two bias directions) and the resin may be an epoxy or a high-temperature resin such as bismaleimide or polyimide. Typically, the preform may include a plurality of layers of the fabric. This plurality of layers could be created by either wrapping a single strip of the fiber around a form, such that the strip is laid repetitively over itself or by separately laying cut plies on top of one another to form the preform. Complex geometries may be formed by both wrapping and laying separate additional plies.

These and still other advantages of the present subject matter will be apparent from the detailed description and drawings. What follows is merely a description of some preferred embodiments. The claims are intended to speak for themselves and these preferred embodiments are not intended to be the only embodiments within the scope of the claims.

DETAILED DESCRIPTION

The various steps of an exemplary method are now described in detail. One of skilled in the art will readily appreciate that the described method is illustrative, but that the described method should not be limited to or restricted only to the specific embodiment disclosed. A number of modifications and variations will be expressly described in the description of the method which fall within the scope of the disclosed subject matter, but other modifications and variations may also be made that are within the spirit and full scope of the same.

Figure 1:
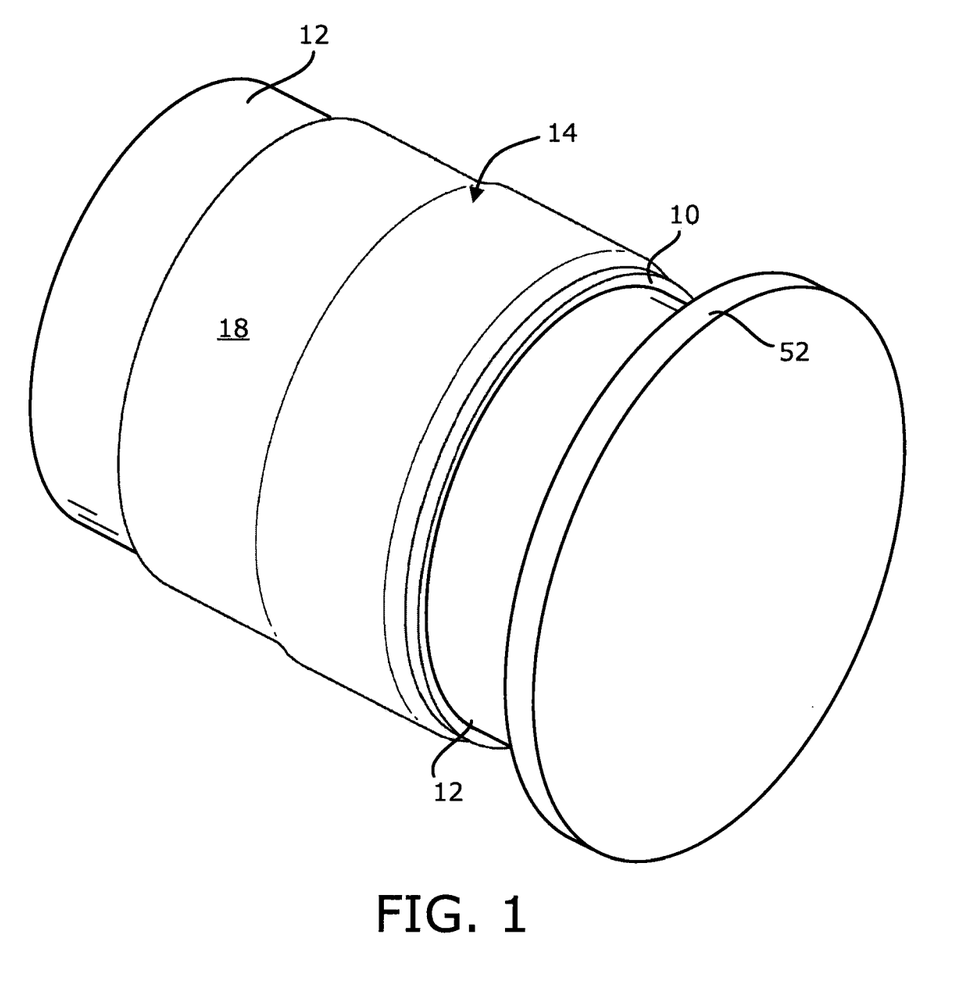
FIG. 1 is an illustration of a preform wrapped around a mandrel.

Referring first to FIG. 1, a fabric 10 is laid or applied to a mold 12 in order to form a preform 14. In the particular form illustrated, in which the preform 14 being made is for a fan containment case for an aircraft, the mold 12 is in the form of a generally cylindrical mandrel and a sheet of fabric 10 is wrapped around the mandrel to create a preform 14 that is generally tubular shaped. The strip of fabric 10 is wrapped around the mandrel various times such that, in a thickness direction (which corresponds to the radial direction of the mandrel), the preform 14 has multiple stacked plies of the fabric 10.

The details of the wrapping process can be found in U.S. patent application publication No. 2013-0160257 (U.S. Ser. No. 13/333,633 filed Dec. 21, 2011) entitled "Method and Apparatus for Applying a Compaction Pressure to a Fabric Preform During Wrapping" which is hereby incorporated herein by reference for all purposes. Although the wrapping, laying, or placement of the fabric on a mold is not limited to the processes described in this U.S. patent application publication, it will be appreciated that the methods, by virtue of control of individual tows of fabric or by virtue of the application of a continuous vacuum during wrapping, enable the formation of extremely tightly wrapped preforms with high fiber volume densities which can be secured by use of a tackifier, tying off, or other means to prevent lofting during preparation for and during the resin molding process. The uses of such methods are particularly advantageous in the context of the description of the method that follows.

In some specific forms, including those described in the patent applications incorporated by reference above, the fabric 10 may be a tri-axial carbon fiber material having a set of axial tows, which are generally oriented in a hoop direction when wrapped around the mandrel or mold 12, and a set of bi-axial tows. Such high strength fiber material may be used to form high strength, lightweight aerospace composite laminates.

In other forms, the fabric 10 may be laid or placed over the mold 12 in other ways. As one example, various patterned cutouts of the fabric 10 may be stacked on, applied to, or laid over the mold 12 to form the preform 14. In some instances, a tackifier may be used to keep the various plies in position with respect to one another. Moreover, while a generally tubular preform is illustrated that will form a generally tubular composite laminate, the shape and geometry of the composite laminates are not necessarily limited to tubular shapes.

In view of the steps that follow in which a resin is injected and infused into the preform 14, it should be appreciated that the fabric 10 is a dry fabric such that a dry preform is initially formed. In this context, dry means that there are air spaces between the fibers of the fabric 10.

FIGS. 3 through 7 are cross-sectional views of the steps of the method and are only schematically representative of the method and components. They are not necessarily to scale or show all of the details of the component elements.

Figure 3:
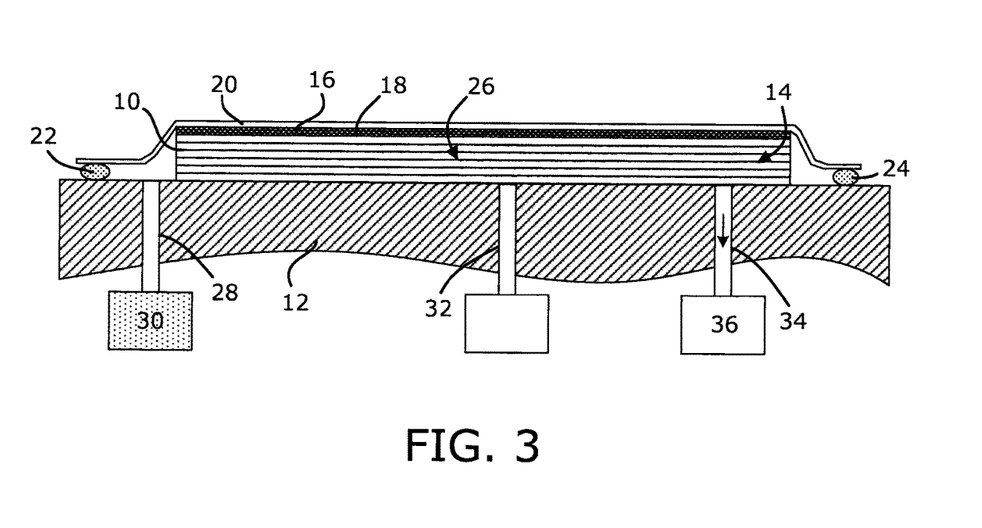
FIG. 3 is a schematic cross-sectional view of a first step of a method according to one example.

Now with additional reference to FIG. 3, once the preform 14 has been formed, a release material 16 can be applied to a surface 18 of the preform 14 and a vacuum bag 20 is received on or placed over the release material 16 an the surface 18 of the preform 14.

The release material 16 is a porous layer or sheet. The release material 16 permits the vacuum bag 20 to be moved away from, be separated from, or be lifted away from the surface 18 of the preform 14. When this happens, the release material 16 will remain in place on the surface 18 of the preform 14 and the release material 16 permits the passage of resin there through and into the preform 14. Once the resin has been cured at the end of the process, this release material 16 also prevents the vacuum bag 20 from bonding to the corresponding surface of the composite laminate, such that the vacuum bag 20 can be more easily removed from the surface of the composite laminate.

The vacuum bag 20 is a gas impervious layer which is sealed at a periphery to the mold 12 at seals 22 and 24. Accordingly, an air-tight chamber is defined by a volume 26 between the vacuum bag 20 and the mold 12 in which the preform 14 is also received and contained. As illustrated, there are a resin injection port 28 through which resin can be injected into the volume 26 between the vacuum bag 20 and the mold 12 and which is further connected to a resin feed supply 30 capable of supplying the resin under positive pressure, an exit port or bleed port 32 from which resin can exit the volume 26, and a vacuum port 34 in communication with a vacuum source 36 which can be used to draw a vacuum in the volume 26 and create a sub-atmospheric pressure within the volume 26 between the vacuum bag 20 and the mold 12.

Although the resin injection port 28, the bleed port 32, and the vacuum port 34 are all illustrated as being formed in the mold 12, one or more of these ports 28, 32, and 34 may be formed at other locations defining the volume 26 of between the vacuum bag 20 and the mold 12. For example, one or more of the ports 28, 32, and 34 may be formed at the seal(s) 22 or 24 between the vacuum bag 20 and the mold 12 or even potentially at an opening in the vacuum bag 20. Still yet, if the seals 22 and 24 are more complex than illustrated, for example if there is another structure between the mold 12 and the vacuum bag 20 that is separately sealed to both, then one or more of the ports 28, 32, and 34 may be formed on this element. Moreover, while only a single type of each port 28, 32, and 34 is illustrated, it will be appreciated that one or more of type of each port 28, 32, and 34 may be present. When there is more than one port 28, 32, and 34 of each type, such ports may be separated into different regions of the volume 26 so as to better perform their function. For example, if the mold 12 is a mandrel, then there may be multiple injection ports over a circumference of the mold 12 to better distribute the resin over the preform 14 during injection.

Figure 4:
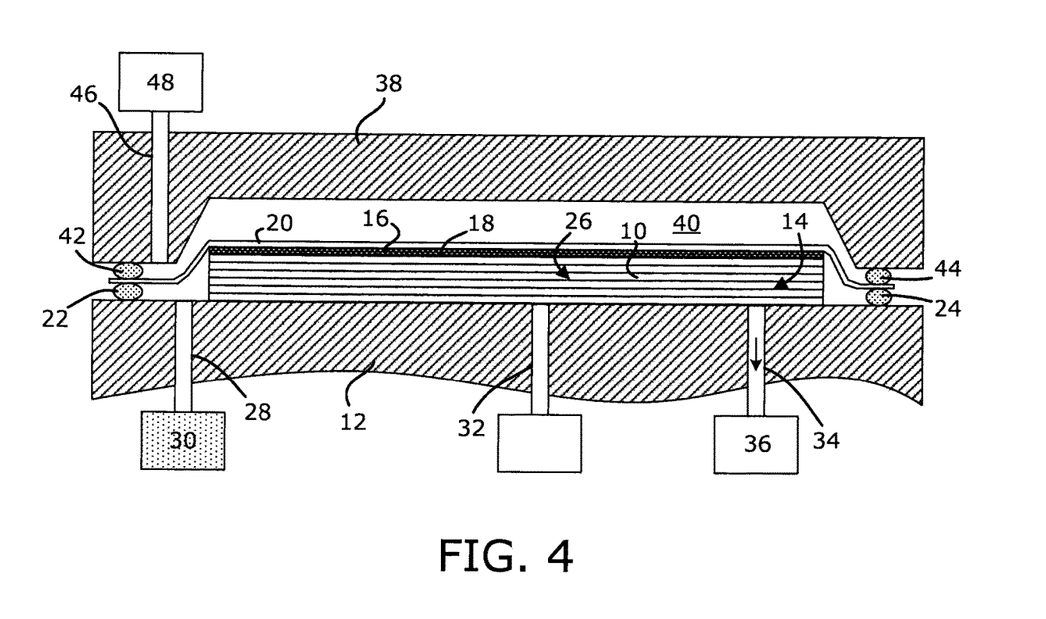
FIG. 4 is a schematic cross-sectional view of a second step of the method according to the one example.

After the release material 16 and vacuum bag 20 are in place, an offset tool 38 is placed outside of the vacuum bag 20 as is schematically illustrated in FIG. 4. The offset tool 38 may be either a substantially rigid body as illustrated or may be flexible and expandable to define a pre-determined fixed shape (for example, a belt or a tubular inextensible bag that could be sealed at its ends with hose clamps or bands). The offset tool 38 is positioned such that the vacuum bag 20 is permitted to lift off the surface 18 of the preform 14 in a controlled and pre-determined amount. The potential displacement of the vacuum bag 20 is established by the distance the offset tool 38 is spaced from the initial placement of the vacuum bag 20 in which the vacuum bag 20 is drawn down against the surface 18 of the preform 14. In the case where the offset tool 38 is substantially rigid, this means that the offset tool 38 can be initially positioned so as to define a volume 40 between the vacuum bag 20 and the offset tool 38. If the offset tool 38 is flexible or collapsible, then this volume 40 might not immediately be established.

In the present illustration, airtight seals 42 and 44 are established such that the volume 40 between the vacuum bag 20 and the offset tool 38 defines a pressure chamber. It will be appreciated that these seals 42 and 44 might be established in a number of locations. For example, in one embodiment, one or more of the seals 42 and 44 could be established between the offset tool 38 and the vacuum bag 20. In another example, one or more of the seals 42 and 44 might be established between the offset tool 38 and the mold 12. Regardless of the specific placement of the seals 42 and 44, the pressure of the volume 40 can be controlled via a pressure port 46. As illustrated, this port 46 is formed in the offset tool 38 to place the pressure chamber or volume 40 in direct communication with a pressure source 48 such as a pump that selectively transports a medium (which might be, for example, a gas or a liquid) into the volume 40 to alter the pressure in the volume 40. In this way, a super-atmospheric pressure can be controllably and evenly applied to the outer surface of the vacuum bag 20 (that is, the surface of the vacuum bag 20 not facing the preform 14) in a way described in subsequent method steps.

In some embodiments, rather than the volume 40 itself serving as an airtight pressure chamber, the volume 40 between the offset tool 38 and the vacuum bag 20 could receive an inflatable bladder shaped to generally correspond to the volume 40. This inflatable bladder could then be in communication with a pressure source.

It should be appreciated that a super-atmospheric pressure may be applied in ways by the offset tool 38 other than by the control of a pressure medium in the volume 40 between the offset tool 38 and the vacuum bag 20. For example, in other embodiments, it is contemplated that the offset tool 38 itself might be physically displaced in order to provide a positive pressure to the outside of the vacuum bag 20. For example, if the offset tool 38 is a belt, then the belt may be restricted in a manner similar to how a hose clamp is operated in which the circumference of the clamp is mechanically adjustable.

Figure 2:
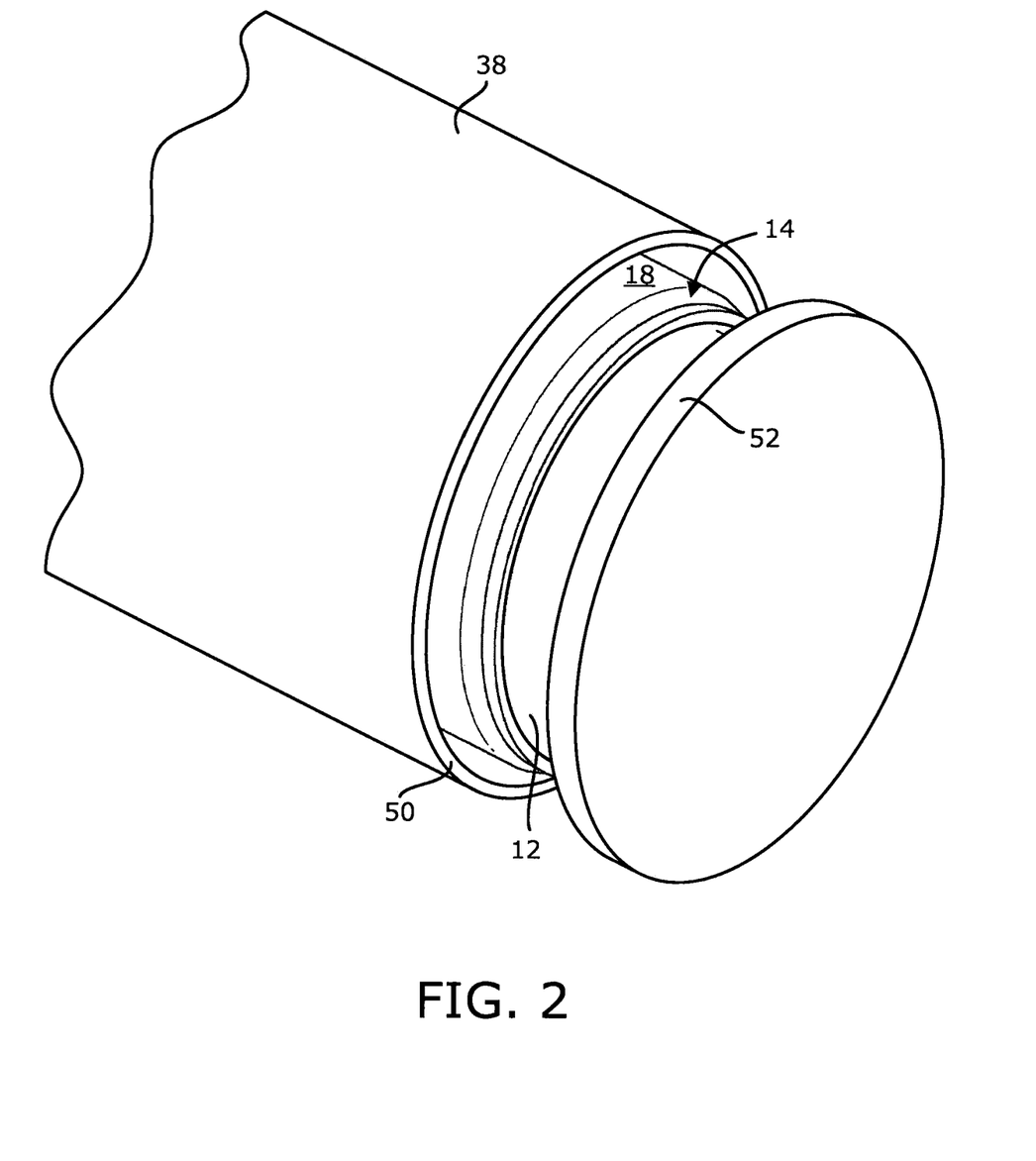
FIG. 2 is an illustration of an offset tool being inserted over a mandrel.

Now, with reference back to FIG. 2, one specific form of inserting an offset tool 38 over a mandrel or mold 12 having a preform 14 is illustrated. In this form, a tubular offset tool 38 is telescopically received over the mandrel 12. In the form illustrated, at least one axial end 50 of the offset tool 38 is sealed against a flange 52 of the mandrel 12. The other axial end may be closed such that it is not required to form a seal between the mold/mandrel and the offset tool 38 on that end. Alternatively, if the offset tool 38 is generally tubular with both axial ends opened, it is contemplated that the offset tool 38 might be formed such that both axial ends form seals with the mandrel 12 by having a first axial end of the offset tool 38 seal against a flange of the mandrel 12 on one end of the preform 14 and a second axial end of the offset tool 38 have a radially inward facing flange that contacts an axial end of the mandrel on the other side of the preform 14. For a tubular or cylindrical geometry, such tooling configurations avoid the need to segment the offset tool 38 into multiple pieces that are assembled around the mandrel 12. However, it is contemplated that multiple piece offset tools might also be used, depending on the geometry of the composite laminate and the practicability of the assembly, such that the created pressure chamber can meet the requirements relating to the application of a super-atmospheric pressure described below.

With the offset tool 38 installed into place, the injection and infusion of resin into the preform 14 can begin. First, if it has not already been done, the vacuum port 34 and vacuum source 36 are used to establish a vacuum or sub-atmospheric pressure in the volume 26 between the vacuum bag 20 and the mold 12 to draw the vacuum bag 20 against the surface 18 of the preform 14 to apply a compaction pressure against the preform 14.

Figure 5:
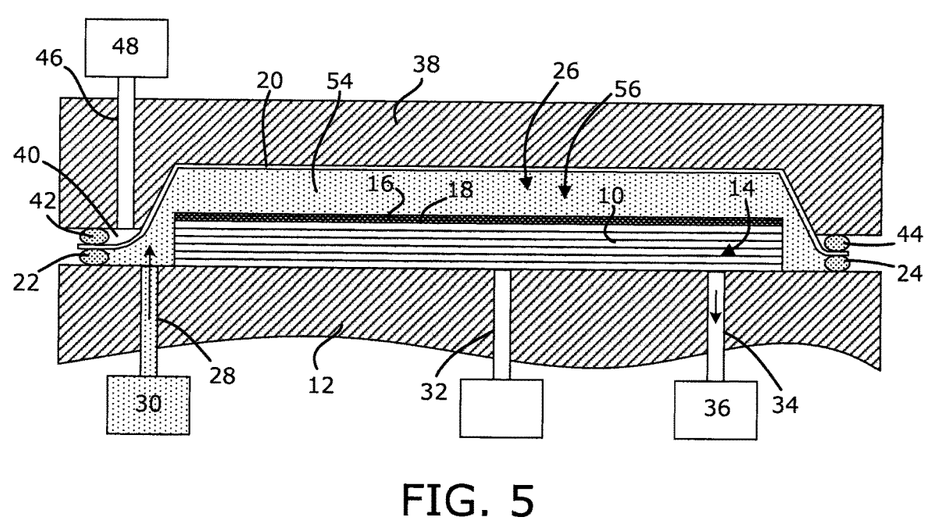
FIG. 5 is a schematic cross-sectional view of a third step of the method according to the one example.

Turning to FIG. 5, in the next step of the method, a charge of resin 54 is forcibly injected into the volume 26 between the vacuum bag 20 and the mold 12 from the resin feed supply 30 via the resin injection port 28. The charge of resin 54 is injected under such a pressure such that the charge of the resin 54 lifts the vacuum bag 20 from the surface 18 of the preform 14 and the charge of resin 54 substantially flows into a volume 56 between the surface 18 of the preform 14 and the vacuum bag 20. This flow pattern of the resin 54 (over the surface 18 of the preform 14 rather that though the bulk of the preform 14) represents the path of least resistance under the system conditions as wicking the resin 54 through the preform 14 is comparably more difficult. At least at this stage, the resin 54 may not substantially infuse into the layers of the preform 14, although some amount of resin 54 may initially enter the fabric layers of the preform 14 during this step.

It should be observed that, as the vacuum bag 20 inflates to the offset tool 38, the vacuum bag 20 is restricted in the amount that it can separate from the surface 18 of the preform 14 by the offset tool 38. In this way, the offset tool 38 effectively controls the manner in which the charge of resin 54 is distributed over the surface 18 of the preform 14 and avoids the resin 54 causing the vacuum bag 20 from mushrooming near the points of resin injection.

As will be discussed in more detail below, the charge of resin 54 may be metered to be a predetermined volume. The amount of the charge may roughly correspond to an amount of resin 54 to infuse the preform 14 in subsequent steps. An additional amount of resin (in excess of the amount to minimally infuse the preform 14) may be included in the charge as well. In some forms, this additional amount of resin may become part of the final composite laminate and may be selected to decrease the fiber volume density to a particular value or to provide an additional amount of resin to provide a surface layer of resin over the fabric layers of the laminate. In other forms, this additional amount of resin may be bled off and provided primarily to ensure that there is a sufficient amount of resin to fully infuse the preform 14.

Once the metered charge of resin 54 is fully injected into the volume 56, then the resin fill step stops. At this point all ports are closed and the injection or fill step is complete.

Figure 6:
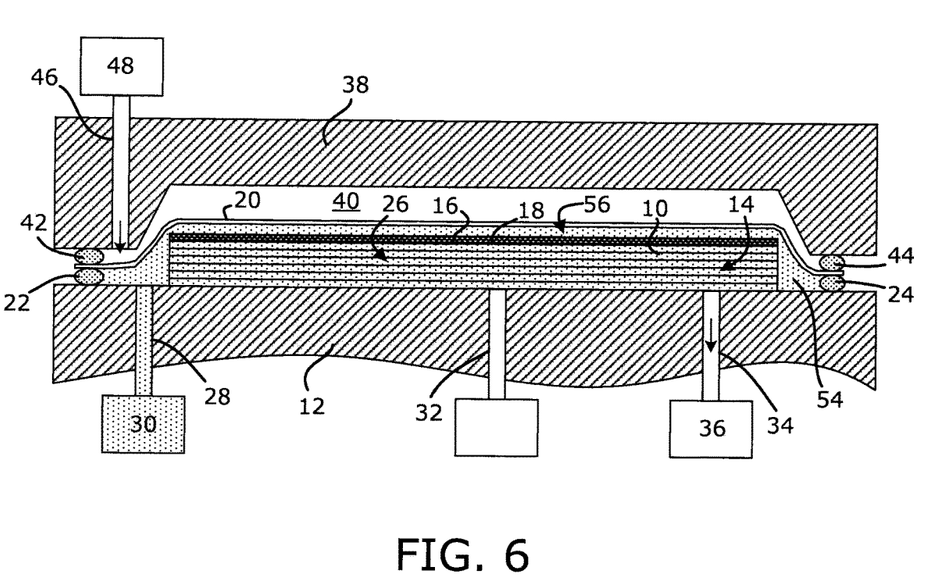
FIG. 6 is a schematic cross-sectional view of a fourth step of the method according to the one example.

Next, and with reference to FIG. 6, the infusion of the charge of resin 54 into the preform 14 begins. In the illustrated embodiment, this infusion is initiated by the application of a first super-atmospheric pressure into the volume 40 between the offset tool 38 and the vacuum bag 20. In one form, this first super-atmospheric pressure is in the form of nitrogen gas. However, other mediums may be used. The application of this first super-atmospheric pressure to the outer surface of the vacuum bag 20 creates a super-atmospheric pressure in the resin 54 that causes the resin 54 to infuse into the preform 14 through the thickness direction of the preform 14. The thickness direction corresponds to a generally radial direction for a generally tubular composite laminate shape.

The thickness direction is, typically, the thinnest dimension of the composite laminate. Thus, by infusing the resin 54 in the way described, the infusion distance through the preform 14, which represents the most resistive part of the process due to the forces that are required to pull or push the resin 54 through the preform 14, are minimized.

Under the continued application of the first super-atmospheric pressure, the resin 54 infuses into the preform 14. However, at some point during this infusion, the bleed port 32 may be opened such that, as the vacuum bag 20 is driven down, some excess amount of resin can be bled or ejected from the volume 26 between the vacuum bag 20 and the mold 12.

Figure 7:
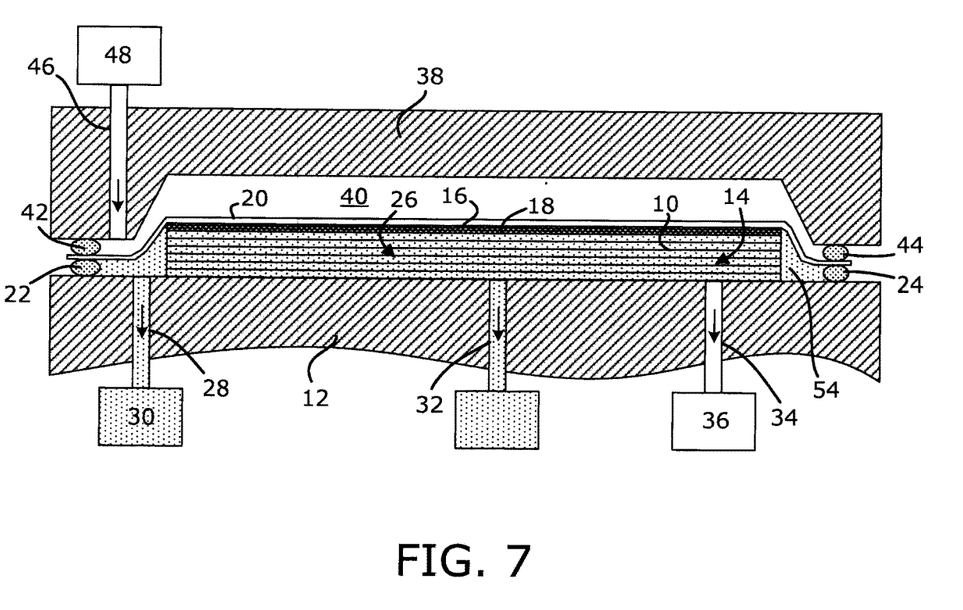
FIG. 7 is a schematic cross-sectional view of a fifth step of the method according to the one example.

Turning now to FIG. 7, a second super-atmospheric pressure may be generated in the volume 40 between the vacuum bag 20 and the offset tool 38. This second super-atmospheric pressure may be greater than the first super-atmospheric pressure. This higher pressure value is intended to drive out all excess resin and to minimize the thickness of the composite laminate and to keep gases compressed or in solution. The exact pressure values may depend, at least in part, on the capability of the offset tool 38 and vacuum bag 20 to maintain the second super-atmospheric pressure (that is, to the extent the tooling can serve as a pressure vessel) as well as take into account that diminishing returns on the amount of compaction of the infused preform may be approached at higher pressures.

The application of this second super-atmospheric pressure may be optional, depending on the desired qualities of the composite laminate to be made. If the desired final composite laminate is to maximize the fiber volume density and minimize weight, then either the first super-atmospheric pressure should be sufficiently high to bleed out the excess resin through the bleed port 32, or optionally port 36 or optionally port 30, or any combination of ports, and to drive the vacuum bag 20 back to the surface 18 of the preform 14 to obtain a minimum thickness (the release material 16 still being in place between the vacuum bag 20 and the preform 14) or this second super-atmospheric pressure should be applied to perform this function.

It is noted that if the composite laminate is to include some amount of excess resin, then the pressure applied to the vacuum bag 20 should be controlled to leave the desired amount of excess resin in the composite laminate.

By the application of super-atmospheric pressure to the resin 54, volatile gases are forces into solution in the resin 54. This reduces the likelihood that gaseous inclusions will be formed in the composite laminate and remain as artifacts after curing. Such inclusion can potentially form points of structural weakness and points of initiation for cracks.

In contrast to this two-step injection and infusion process, conventional infusion typically does not include the application of super-atmospheric pressure and relies only on the use of a vacuum to slowly draw resin through the preform. The use of the vacuum has heretofore been considered required to make sure that the vacuum bag remains in contact with the surface of the preform to apply a compaction force to the preform. If the vacuum bag were to separate from the surface of the preform, then the preform was prone to lofting and the fiber volume density in the composite laminate would be compromised (that is, the fiber volume density would be decreased). As a result, the infusion process was exceptionally slow because, even with the addition of expensive flow media to serve as high speed conduits over the surface of the preform for distribution of the resin, the resin still would need to be transported over some substantial resistive distance through the preform in a non-thickness direction. However, the preforms that are used in the disclosed method can be extremely tightly wound, for example, using methods described in the inventor's earlier work (which are found in U.S. patent application publication No. 2013-0160257). Using these methods or other techniques in which the preforms are made to not loft enables the use of this new two-stage injection and infusion process in which the vacuum bag is able to be lifted from the surface of the preform.

Moreover, according to old methods, the driving force for the resin was limited to approximately a difference of one atmosphere, because a vacuum was the only driving force for the resin. Still yet, the application of a vacuum was more likely to draw gas out of solution to form inclusions.

In comparison, the process now disclosed is much faster by orders of magnitude due to the reduction of resistance during injection and the super-atmospheric pressure assistance during infusion. The reduction of process time is particularly valuable because, during the injection process, the resin is often heated to improve flowability. In some forms of the disclosed method, the resin may still be heated to improve flowability of the resin and this heat may be supplied, at least in part, by the medium used to apply the super-atmospheric pressures to the vacuum bag. However, applied heat also tends to cause the resin to begin to cure, which makes the resin more viscous and difficult to transport through the preform. This makes infusion a very time sensitive process in which the longer the infusion takes, the more difficult it becomes to fully work the resin to complete the infusion. Moreover, in the disclosed process flow media is not necessarily utilized, and flow media can be both expensive ad time consuming to implement in a process.

It should also be appreciated that, during the injection and infusion of the resin 54, the vacuum port 34 may be operated to maintain a vacuum or sub-atmospheric pressure in the volume between the resin 54 and the mold 12 to help draw the resin 54 through the preform 14 and towards the mold 12. This vacuum would assist in the infusion of the resin 54 into the preform 14, although it is contemplated that the super-atmospheric pressure may serve as the primary driving force for infusion.

Returning now to the process, once the desired amount of resin 54 has been infused into the preform 14, the bleed or exit port 32 may be closed and the resin 54 can be cured in the preform 14 in order to form the composite laminate. This curing can occur while the super-atmospheric pressure is maintained between the offset tool 38 and the vacuum bag 20 and may involve the passage of time and the addition of heat to increase the rate of curing.

Figure 8:
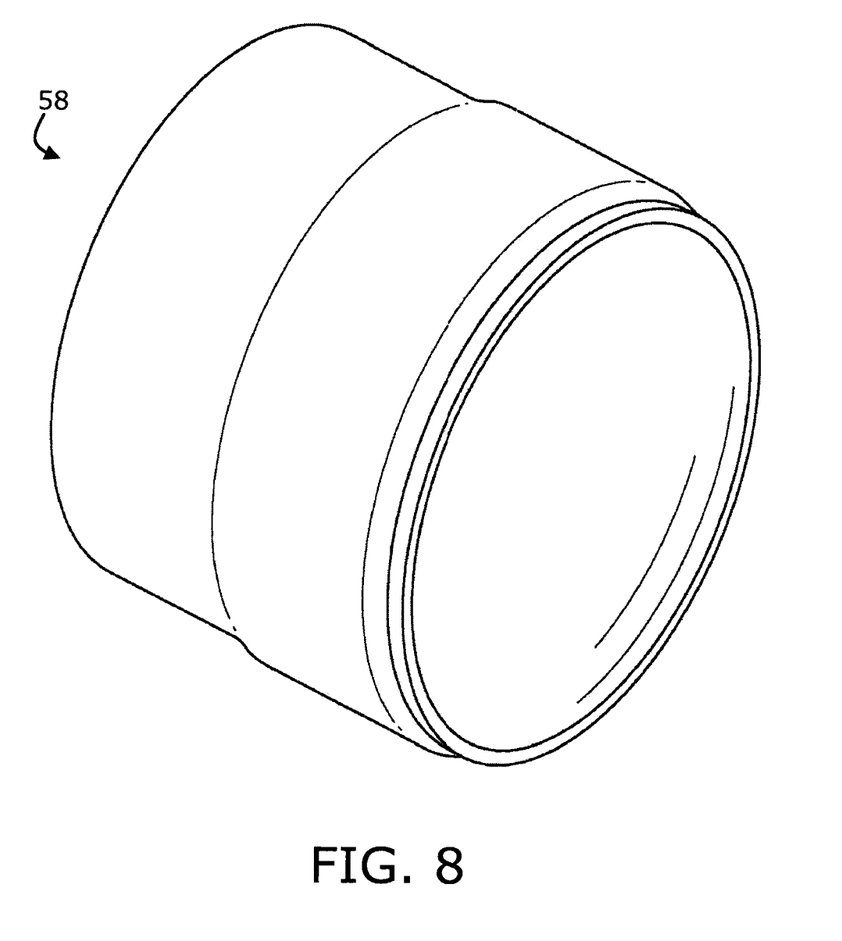
FIG. 8 illustrates a final laminate composite according to one example.

One the curing is completed, the composite laminate 68 has been formed and the tooling and the vacuum bag 20 are removed. An exemplary composite laminate is illustrated in FIG. 8. It should be observed that, composite laminates formed by this method can have exceptional fiber-to-resin ratios. For example, the fiber volume density can be 60%, 65%, or even upwards of 70%.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of infusing a preform with a resin for the formation of a composite laminate, the method comprising:
   wrapping the preform around a mold to prevent the preform from lofting;
   placing a vacuum bag outside of the preform;
   placing an offset tool outside of the vacuum bag so as to permit the vacuum bag to lift away from a surface of the preform a controlled amount;
   injecting a charge of the resin between the vacuum bag and the preform so as to lift the vacuum bag off the surface of the preform and move the vacuum bag toward the offset tool, so that the resin occupies a volume between the vacuum bag and the surface of the preform and presses the vacuum bag against the offset tool while the offset tool remains stationary;
   infusing the preform with the resin by evenly applying a super-atmospheric pressure to an outer surface of the vacuum bag to transport the resin from the volume between the vacuum bag and the surface of the preform into a volume within the preform; and
   curing the resin in the preform, thereby forming the composite laminate.

2. The method of claim 1, wherein the step of infusing the preform includes transporting the resin primarily into and through a thickness direction of the preform from the vacuum bag towards the mold.

3. The method of claim 1, wherein during the step of injecting a charge of the resin between the vacuum bag and the preform, substantially none of the resin is infused into the preform.

4. The method of claim 1, wherein applying the super-atmospheric pressure to the outer surface of the vacuum bag includes:
   initially applying a first super-atmospheric pressure to the vacuum bag to transport the resin from the volume between the vacuum bag and the surface of the preform into the volume within the preform; and
   subsequently applying a second super-atmospheric pressure from the outside of the vacuum bag, in which the second super-atmospheric pressure is greater than the first super-atmospheric pressure, the second super-atmospheric pressure being applied to drive the preform infused with the resin to a minimum thickness.

5. The method of claim 1, wherein the super-atmospheric pressure is maintained through the step of curing the resin in the preform.

6. The method of claim 5, wherein a medium used to apply the super-atmospheric pressure is at least one of a gas or a fluid received between the offset tool and the vacuum bag and the medium is heated to assist in the step of curing the resin in the preform.

7. The method of claim 1, wherein, after injecting the charge of the resin between the vacuum bag and the preform, all ports to a volume between the vacuum bag and the mold are closed while the super-atmospheric pressure is initially applied to the vacuum bag and wherein, after the resin has infused the preform, at least one port to the volume between the vacuum bag and the mold are opened.

8. The method of claim 1, wherein the mold and the offset tool are substantially rigid bodies.

9. The method of claim 1, wherein the offset tool is flexible and expandable to define a pre-determined fixed shape.

10. The method of claim 1, wherein the charge of resin includes an excess amount of resin exceeding an amount of resin to completely infuse the preform.

11. The method of claim 10, wherein, during the step of infusing the preform with the resin, the excess amount of resin is forced out of the preform through an exit port of the mold and removed from the composite laminate aided at least in part by the super-atmospheric pressure.

12. The method of claim 1, wherein the step of injecting the charge of resin between the vacuum bag and the preform includes forcibly injecting the resin into the volume between the vacuum bag and the surface of the preform from a feed source via an injection port.

13. The method of claim 1, further comprising applying a vacuum between the vacuum bag and the mold during at least one of the steps of injecting the charge of the resin between the vacuum bag and the surface of the preform and infusing the preform with the resin.

14. The method of claim 1, further comprising, after placing the fabric on the mold to form the preform but before applying the vacuum bag over the surface of the preform, applying a release material to the surface of the preform that permits for the vacuum bag to be separated from the surface of the preform and accommodates the resin to be transported through the release material into the preform during infusion.

16. The method of claim 1, wherein the mold is a mandrel and the offset tool is a generally tubular sleeve that is received around the mandrel such that the mandrel is coaxial with the offset tool.

16. The method of claim 1, wherein the composite laminate has a fiber volume density of seventy percent.

* * * * *